United States Patent
Sitler et al.

(10) Patent No.: US 11,861,717 B2
(45) Date of Patent: Jan. 2, 2024

(54) MEDICAL IDENTITY THEFT ALERT SYSTEM

(71) Applicant: Optum, Inc., Minnetonka, MN (US)

(72) Inventors: Brad K. Sitler, Crownsville, MD (US); Thomas R. Gilbertson, Hartford, CT (US)

(73) Assignee: OPTUM, INC., Minnetonka, MN (US)

( * ) Notice: Subject to any disclaimer, the term of this patent is extended or adjusted under 35 U.S.C. 154(b) by 331 days.

(21) Appl. No.: 16/396,376

(22) Filed: Apr. 26, 2019

(65) Prior Publication Data

US 2020/0342541 A1 Oct. 29, 2020

(51) Int. Cl.
 *G06Q 40/08* (2012.01)
 *G06N 20/00* (2019.01)
 *G06Q 50/26* (2012.01)

(52) U.S. Cl.
 CPC ............ *G06Q 40/08* (2013.01); *G06N 20/00* (2019.01); *G06Q 50/265* (2013.01)

(58) Field of Classification Search
 CPC .... G06Q 30/0185; G06Q 20/40; G06Q 40/08; G06Q 20/401; G16H 10/60
 See application file for complete search history.

(56) References Cited

U.S. PATENT DOCUMENTS

| | | | |
|---|---|---|---|
| 8,392,213 B2* | 3/2013 | Beraja | H04W 4/029 |
| | | | 705/2 |
| 9,727,919 B2 | 8/2017 | Gregg et al. | |
| 2004/0064343 A1* | 4/2004 | Korpman | G16H 50/20 |
| | | | 600/300 |
| 2006/0047539 A1* | 3/2006 | Huang | G06Q 10/10 |
| | | | 705/2 |
| 2013/0006655 A1* | 1/2013 | Van Arkel | G06Q 10/10 |
| | | | 705/2 |
| 2013/0006668 A1 | 1/2013 | Van Arkel et al. | |
| 2013/0124223 A1* | 5/2013 | Gregg | G06Q 30/0185 |
| | | | 705/3 |
| 2014/0297304 A1* | 10/2014 | Nguyen | G06Q 30/06 |
| | | | 705/2 |
| 2015/0081324 A1* | 3/2015 | Adjaoute | G06Q 40/08 |
| | | | 705/2 |

\* cited by examiner

*Primary Examiner* — Richard C Weisberger
(74) *Attorney, Agent, or Firm* — Shumaker & Sieffert, P.A.

(57) ABSTRACT

A computing system may receive a verification of benefits (VoB) request that identifies a subscriber and a healthcare provider that submitted the VoB request. The VoB request may comprise a request for the computing system to verify that a health insurance policy of the subscriber is active. In response to determining that the health insurance policy of the identified subscriber is active, the computing system may determine whether to send a subscriber alert to the subscriber. The subscriber alert may notify the subscriber that the healthcare provider has been requested to perform a healthcare action for the subscriber in the future as of a time the healthcare provider submitted the VoB request. Based on a determination to send the subscriber alert, the computing system may initiate a process to send the subscriber alert.

16 Claims, 6 Drawing Sheets

MEDICAL IDENTITY THEFT ALERT SYSTEM

TECHNICAL FIELD

This disclosure relates to computing systems that perform healthcare-related activities.

BACKGROUND

Medical identity theft is a growing problem around the world. One form of medical identity theft may occur when a first person obtains information that identifies a health insurance policy of a second person. The first person may then use that information to obtain healthcare services from a healthcare provider. For example, if the first person obtains information that identifies the second person's health insurance policy, the first person may be able use the second person's health insurance policy to obtain pharmaceuticals without the first person paying for the pharmaceuticals. Instead, the second person and the second person's health insurance provider may be billed for the pharmaceuticals.

SUMMARY

When a person seeks a healthcare action from a healthcare provider, the healthcare provider may submit a verification of benefits (VoB) request to a health insurance provider of the person before performing the healthcare action for the person. Examples of healthcare actions may include providing healthcare services and dispensing healthcare products. The VoB request includes information that identifies the person. For instance, a VoB request may include a name of the person and a policy number of a health insurance policy of the person. A computing system of the health insurance provider may respond to the VoB request by indicating whether the health insurance policy of the person identified in the VoB request is active.

One type of medical identity theft may occur when a first person, who is seeking a healthcare action from a healthcare provider, provides the healthcare provider with information that identifies a second person. Thus, a VoB submitted by the healthcare provider may include information that identifies the second person instead of the first person. Because the second person may have an active health insurance policy, the computing system of the health insurance provider may correctly indicate that the second person has an active health insurance policy. Thus, the healthcare provider may perform the healthcare action to the first person and bill the health insurance provider and the second person. Typically, the second person does not learn that the health insurance policy of the second person has been used by the first person until the second person receives the bill from the healthcare provider, by which point it may be too late to determine the true identity of the first person.

This disclosure describes techniques for selectively sending subscriber alerts to subscribers in response to VoB requests that identify the subscribers. As described herein, a computing system may respond to a VoB request by performing a process that determines whether or not to send a subscriber alert to a subscriber identified by the VoB request. The subscriber alert may notify the subscriber that the healthcare provider that submitted the VoB request has been requested to perform a healthcare action for the subscriber in the future as of a time the healthcare provider submitted the VoB request. By receiving the subscriber alert, the subscriber may have the opportunity to indicate whether the VoB request is legitimate or suspicious.

In one aspect, this disclosure describes a method comprising: receiving, by a computing system, via a communications network, a VoB request that was submitted by a healthcare provider and that identifies a subscriber, the VoB request comprising a request for the computing system to verify that a health insurance policy of the subscriber is active; in response to receiving the VoB request: determining, by the computing system, whether a health insurance policy of the identified subscriber is active; and providing, by the computing system, a VoB response to the healthcare provider, the VoB response indicating whether the health insurance policy of the subscriber is active; and in response to determining that the health insurance policy of the identified subscriber is active: determining, by the computing system, whether to send a subscriber alert to the subscriber, wherein the subscriber alert notifies the subscriber that the healthcare provider has been requested to perform a healthcare action for the subscriber in the future as of a time the healthcare provider submitted the VoB request; and based on a determination to send the subscriber alert, initiating, by the computing system, a process to send the subscriber alert to the subscriber.

In another aspect, this disclosure describes a computing system comprising: a set of one or more communication units configured to receive, via a communications network, a VoB request that was submitted by a healthcare provider and that identifies a subscriber, the VoB request comprising a request for the computing system to verify that a health insurance policy of the subscriber is active; and one or more processors configured to: in response to receiving the VoB request: determine whether a health insurance policy of the identified subscriber is active; and provide a VoB response to the healthcare provider, the VoB response indicating whether the health insurance policy of the subscriber is active; and in response to determining that the health insurance policy of the identified subscriber is active: determine whether to send a subscriber alert to the subscriber, wherein the subscriber alert notifies the subscriber that the healthcare provider has been requested to perform a healthcare action for the subscriber in the future as of a time the healthcare provider submitted the VoB request; and based on a determination to send the subscriber alert, initiate a process to send the subscriber alert to the subscriber.

In another aspect, this disclosure describes a non-transitory computer-readable storage medium having instructions stored thereon that, when executed, configure a computing system to: receive, via a communications network, a VoB request that identifies a subscriber and a healthcare provider that submitted the VoB request, the VoB request comprising a request for the computing system to verify that a health insurance policy of the subscriber is active; in response to receiving the VoB request: determine whether a health insurance policy of the identified subscriber is active; and provide a VoB response to the healthcare provider, the VoB response indicating whether the health insurance policy of the subscriber is active; and in response to determining that the health insurance policy of the identified subscriber is active: determine whether to send a subscriber alert to the subscriber, wherein the subscriber alert notifies the subscriber that the healthcare provider has been requested to perform a healthcare action for the subscriber in the future as of a time the healthcare provider submitted the VoB request; and based on a determination to send the subscriber alert, initiate a process to send the subscriber alert to the subscriber.

In another aspect, this disclosure describes a computing system comprising: means for receiving, via a communications network, a VoB request that identifies a subscriber and a healthcare provider that submitted the VoB request, the VoB request comprising a request for the computing system to verify that a health insurance policy of the subscriber is active; means for determining, in response to receiving the VoB request, whether a health insurance policy of the identified subscriber is active and providing a VoB response to the healthcare provider, the VoB response indicating whether the health insurance policy of the subscriber is active; means for determining, in response to determining that the health insurance policy of the identified subscriber is active, whether to send a subscriber alert to the subscriber, wherein the subscriber alert notifies the subscriber that the healthcare provider has been requested to perform a healthcare action for the subscriber in the future as of a time the healthcare provider submitted the VoB request; and means for initiating, based on a determination to send the subscriber alert, a process to send the subscriber alert to the subscriber.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
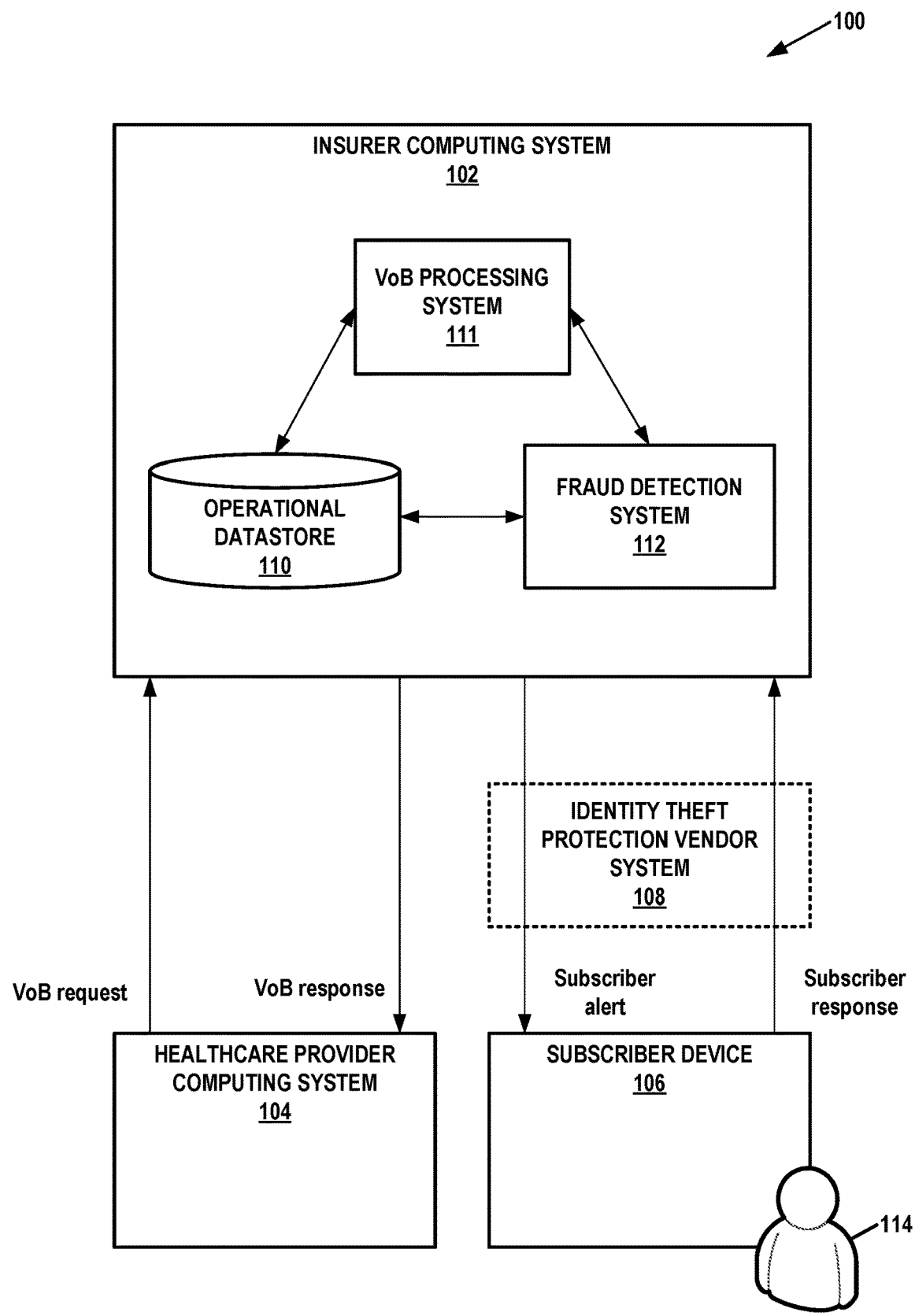
FIG. 1 is a block diagram illustrating an example system in accordance with one or more aspects of this disclosure.

FIG. 1 is a block diagram illustrating an example system 100 in accordance with one or more aspects of this disclosure. In the example of FIG. 1, system 100 includes an insurer computing system 102, a healthcare provider computing system 104, a subscriber device 106, and an identity theft protection vendor system 108. In other examples, system 100 may include more, fewer, or different components. For instance, in some examples, system 100 does not include identity theft protection vendor system 108. In some examples, system 100 may include additional subscriber devices and/or one or more additional healthcare provider computing systems.

Insurer computing system 102 may include one or more computing devices. In examples where insurer computing system 102 includes two or more computing devices, the computing devices of insurer computing system 102 may act together as a system. Example types of computing devices include server devices, personal computers, handheld computers, intermediate network devices, data storage devices, and so on. In examples were insurer computing system 102 includes two or more computing devices, the computing devices of computing system 102 may be geographically distributed or concentrated together, e.g., in a single data center.

Similarly, healthcare provider computing system 104 may comprise one or more computing devices. In examples where healthcare provider computing system 104 includes two or more computing devices, the computing devices of healthcare provider computing system 104 may act together as a system. Likewise, identity theft protection vendor system 108 may comprise one or more computing devices. In examples where identity theft protection vendor system 108 includes two or more computing devices, the computing devices of identity theft protection vendor system 108 may act together as a system. Subscriber device 106 may be a computing device, such as a mobile telephone, tablet, personal computer, wearable device, or other type of computing device.

Insurer computing system 102, healthcare provider computing system 104, subscriber device 106, and identity theft protection vendor system 108 may communicate via one or more communication networks. For instance, in some examples, insurer computing system 102, healthcare provider computing system 104, subscriber device 106, and/or identity theft protection vendor system 108 may communicate via a wide area network, such as the Internet. The communication networks may include one or more wireless or wire-based communication links.

Insurer computing system 102 may be operated by or on behalf of a health insurance provider. A health insurance provider is an organization that provides health insurance policies to subscribers. The health insurance provider may pay some or all medical expenses incurred by a subscriber of a health insurance policy provided by the health insurance provider. Medical expenses may include charges for performing healthcare actions, such as providing healthcare services, dispensing healthcare products, and other activities related to providing healthcare. Examples of healthcare services may include physician visits, medical imaging, surgery, diagnostic services, lab tests, palliative care, mental health services, addiction rehabilitation services, physical therapy, and other types of services related to the health of a patient. Examples of healthcare products may include pharmaceuticals, drugs, test kits, crutches, wheelchairs, bandages, surgical supplies, medical consumables, and other types of products related to the health of a patient.

Healthcare provider computing system 104 may be operated by or on behalf of a healthcare provider. Example types of healthcare providers may include physicians, hospitals, clinics, pharmacies, laboratory service providers, nursing homes, and other types of individuals and organizations that perform healthcare actions.

When a healthcare provider receives a request to perform a healthcare action for a person who claims to have a health insurance policy from the health insurance provider, the healthcare provider may use healthcare provider computing system 104 to submit a VoB request to insurer computing system 102. The VoB request includes personal identification information that identifies a person. The personal identification information may include a name of the person, a health insurance policy number of the person, a date of birth of the person, or other types of information that may be used to identify the person.

The healthcare provider may use healthcare provider computing system 104 to submit a VoB request in one or more of various ways. For instance, in one example, a special-purpose software application installed on healthcare provider computing system 104 may be configured to send the VoB request to insurer computing system 102. In some examples, healthcare provider computing system 104 may access a web site provided by insurer computing system 102 that includes features to submit a VoB request to insurer computing system 102. In some examples, rather than healthcare provider computing system 104 sending a VoB request and receiving a VoB response, a person associated with the healthcare provider may make a phone call to a call center associated with the health insurance provider. In such examples, a person at the call center may input the VoB request to insurer computing system 102, receive a VoB response from insurer computing system 102, and then tell the person associated with the healthcare provider what the VoB response indicates. The person at the call center of the health insurance provider may or may not provide information identifying the healthcare provider to insurer computing system 102. In examples where the person at the call center does not provide information identifying the healthcare provider to insurer computing system 102, the processes described elsewhere in this disclosure may still apply, but any associated subscriber alerts might not include information identifying the healthcare provider. In some examples, the healthcare provider may submit VoB requests to insurer computing system 102 individually. In some examples, the healthcare provider may submit VoB requests to insurer computing system 102 in batches of multiple VoB requests.

A VoB processing system 111 of insurer computing system 102 may automatically process VoB requests submitted by healthcare provider computing system 104 and/or other healthcare provider computing systems. In general, to process a VoB request, VoB processing system 111 may access data stored in an operational datastore 110 of insurer computing system 102 to determine whether a person identified by the personal identification information included in the VoB request has an active health insurance policy provided by the health insurance provider for a set of applicable dates. Operational datastore 110 may include data indicating the active and inactive statuses of health insurance policies provided by the health insurance provider, VoB histories, claim histories, and other types of information. In some examples, the VoB request may specify the set of applicable dates. In some examples, VoB processing system 111 may infer the set of applicable dates to be a given set of dates, such as only the current date, for the next 2 weeks, for the next 1 month, or another set of dates.

VoB processing system 111 may send a VoB response to healthcare provider computing system 104 in response to the VoB request. The VoB response may include information indicating whether the person identified by the personal identification information included in the VoB request has an active health insurance policy provided by the health insurance provider for the applicable dates. If the VoB response indicates that the person identified by the personal identification information included in the VoB request has an active health insurance policy provided by the health insurance provider for the applicable dates, the healthcare provider may proceed with a healthcare action.

Sending VoB requests to insurer computing system 102 may provide several benefits. For example, patients may be unaware that their health insurance policies have lapsed or changed. As a result, patients may innocently request healthcare services on the assumption that their health insurance provider will pay at least a portion of the healthcare provider's charges for the healthcare services. In this example, the patients may not discover that their health insurance policies have lapsed until the patients receive bills for the full amount of the healthcare provider's charges. Patients in such a situation may blame the healthcare provider or the health insurance provider and may delay payment to the healthcare provider. In any case, confusion and extra work may occur. Thus, verifying that a patient has an active health insurance policy before performing a healthcare action may enable the healthcare provider and the patient to decide how to proceed before the healthcare action is performed.

However, the system of sending VoB requests and receiving VoB responses is not effective in stopping some forms of medical identity theft. For instance, the system of sending VoB requests and receiving VoB responses is not effective in stopping a healthcare provider from performing a healthcare action for a first person if the first person provides a second person's identifying information to the healthcare provider. In other words, if the second person has an active health insurance policy and the first person uses the second person's identity when requesting the healthcare action from the healthcare provider, the associated VoB response would indicate that the second person has an active health insurance policy for the applicable dates and the healthcare provider would proceed to perform the healthcare action. In this way, the first person could use the second person's health insurance policy to induce the healthcare provider to perform the healthcare action without the first person ever needing to pay the healthcare provider or the health insurance provider.

As noted above, using a second person's health insurance policy to induce a healthcare provider to perform a healthcare action for a first person may be one form of medical identity theft. Other forms of medical identity theft include the use by a first person of a second person's health insurance policy to fraudulently secure payment for healthcare actions that were never performed, the creation of a new identity for the first person using the second person's healthcare record and data, and so on.

Medical identity theft is a growing trend for several reasons. For example, the financial institutions and retailers use increasingly sophisticated techniques for monitoring and assessing purchase transactions in real time. Accordingly, the value of credit cards and debit cards on the black market is decreasing. This has motivated criminals to focus on stealing healthcare data, such as data identifying individual's health insurance policies. In general, healthcare data can be used illegally for longer time periods than stolen credit or debit card information before the deception and theft is discovered. Another reason for the increase in medical identity theft is the ongoing epidemic of abuse of prescription medicines, such as opioids. That is, a first person could use a second person's medical identity to obtain prescription medicines for use or distribution by the first person, without the first person paying for the prescription medicines. Being able to steal the medical identity of a person who has a legitimate medical history of needing opioids may be especially valuable to criminals because criminals could use this medical history to obtain opioids without submitting to additional physical medical examination. Data breaches of various organizations have contributed to the ability of criminals to obtain the information needed to commit medical identity theft.

In situations where a first person is attempting to use a second person's health insurance policy to induce a healthcare provide to perform a healthcare action for the first person, it would be ideal to stop the first person from illegally using the second person's health insurance policy before the healthcare provider performs the healthcare action for the first person. Hence, in accordance with a technique of this disclosure, insurer computing system 102 implements a fraud detection system 112. Fraud detection system 112 may monitor VoB requests received by VoB processing system 111 of insurer computing system 102, such as VoB requests received from healthcare provider computing system 104. For example, in response to receiving a VoB request and VoB processing system 111 determining that a person identified by the VoB request has an active health insurance policy from the health insurance provider, fraud detection system 112 may send a subscriber alert or, in some examples, instruct identity theft protection vendor system 108 to send a subscriber alert. The subscriber alert may comprise a message intended to notify a subscriber identified by a VoB request that someone else may be trying to use the subscriber's health insurance policy. For instance, the subscriber alert may notify the subscriber that a healthcare provider has been requested to perform a healthcare action for the subscriber at a time that is in the future at least as of a time the healthcare provider submitted the VoB request. In some examples, the subscriber alert may specify a healthcare provider that submitted the VoB request and, in some examples, may specify applicable dates during which the healthcare provider plans to perform healthcare actions for the subscriber. In some examples, the subscriber alert may also specify a requested healthcare action. This disclosure may refer to a person who has an active health insurance policy from the health insurance provider and who has agreed to receive subscriber alerts as a subscriber.

Based on a determination to send a subscriber alert to a subscriber, fraud detection system 112 may initiate a process to send the subscriber alert to the subscriber. In the example of FIG. 1, as part of the process to send the subscriber alert to the subscriber, fraud detection system 112 may instruct identity theft protection vendor system 108 to send a subscriber alert. Identity theft protection vendor system 108 may comprise a computing system operated by or on behalf of an identity theft protection vendor.

The identity theft protection vendor may provide identity theft protection services to subscribers. For example, the identity theft protection vendor may provide services that monitor credit histories, commercial transactions, and other types of data for signs that the identities of subscribers may have been stolen. In some examples, the identity theft protection vendor may interact with one or more health insurance providers to determine whether someone is attempting to create or obtain a health insurance policy using a different person's identity. The identity theft protection vendor may offer services that help subscribers recover from identity theft. Furthermore, in some examples, the identity theft protection vendor may provide identity theft insurance policies to subscribers that help to defray the subscribers' expenses associated with identity theft. In some examples, identity theft protection vendor system 108 implements fraud detection system 112 and receives a stream of VoB requests.

In some examples, the identity theft protection vendor is an entity separate from the health insurance provider and healthcare provider. Arrangements in which the identity theft protection vendor and the health insurance provider are separate entities may help each focus on their core competencies. This may be important given that providing identity theft protection is an increasingly complicated endeavor and may require communication across multiple business enterprises and/or governmental agencies, some of which are not permitted to share certain types of data. For instance, it may be improper for a credit reporting agency to obtain information about a person's medical history. However, in some examples, the health insurance provider and the identity theft protection vendor may be the same entity. In examples where the health insurance provider and the identity theft protection vendor are the same entity, the step of instructing identity theft protection vendor system 108 to send a subscriber alert may be omitted and insurer computing system 102 may perform actions described in this disclosure as being performed by identity theft protection vendor system 108. In some examples, identity theft protection services are merely one type of services provided by identity theft protection vendor. For instance, a primary line of business of identity theft protection vendor may be pharmacy benefit management, data analysis services, or other types of businesses.

In response to receiving instructions from fraud detection system 112 to send a subscriber alert, identity theft protection vendor system 108 may determine a communication channel through which to send the subscriber alert. For instance, in some examples, identity theft protection vendor system 108 may access a database that maps each subscriber to one or more communication channels associated with the subscriber. Typically, each of the communication channels associated with the subscriber would be difficult for a person other than the subscriber to use. For instance, in one example, the communication channels may include a special-purpose application installed on the subscriber's mobile phone that presents subscriber alerts. Thus, in this example, in addition to having any information needed to induce a healthcare provider to perform a VoB request that identifies a subscriber, a criminal would also need to have access to and be able to unlock the subscriber's mobile phone in order to receive subscriber alerts. In some examples, the special-purpose application may request authentication credentials different from any authentication credentials needed to unlock the subscriber's mobile phone, thereby further increasing security. In some examples, the communication channels may include an email account of the subscriber. Thus, in this example, in addition to having any information needed to induce a healthcare provider to perform a VoB request that identifies a subscriber, a criminal would need to have access to the subscriber's email account. In the example of FIG. 1, it is assumed that a subscriber 114 uses subscriber device 106 to receive subscriber alerts.

After identifying a communication channel associated with a subscriber, identity theft protection vendor system 108 may send the subscriber alert via the identified communication channel. Identity theft protection vendor system 108 may subsequently receive a subscriber response that indicates whether the subscriber thinks it suspicious that a particular healthcare provider indicated by the VoB request is planning to perform a healthcare action for subscriber. In other words, the subscriber response may indicate whether the subscriber believes the VoB request to be legitimate; although, in some examples, the subscriber alert does not indicate or explain that a VoB request is what caused identity theft protection vendor system 108 to send the subscriber alert. In some examples, in response to receiving a subscriber response, identity theft protection vendor system 108 may provide information to fraud detection system 112. The information provided to fraud detection system 112 may indicate whether the subscriber believes that the VoB request is legitimate. In some examples, identity theft protection vendor system 108 may handle the subscriber response without further involvement from insurer computing system 102.

In one example where the identified communication channel for subscriber 114 is a special-purpose application installed on subscriber device 106, identity theft protection vendor system 108 may send the subscriber alert to an application programming interface (API) of the special-purpose application. In some such examples, the special-purpose application may be branded in a manner consistent with the brand indicia of the identity theft protection vendor. In other such examples, the special-purpose application may be branded in a manner consistent with the brand indicia of the health insurance provider. In this example, the special-purpose application may, in response to receiving the subscriber alert, cause subscriber device 106 to output a notification regarding the subscriber alert. For example, the special-purpose application may cause subscriber device 106 to output a popup message for display, generate a notification sound, provide haptic vibration, and/or otherwise notify subscriber 114 to the arrival of the subscriber alert. In this example, the special-purpose application may output a user interface for display that includes features that allow subscriber 114 to provide user input that indicates whether subscriber 114 believes the VoB request to be legitimate. For instance, subscriber 114 may believe that the VoB request from a healthcare provider is legitimate if subscriber 114 is currently visiting or has plans to visit an office of the healthcare provider, or otherwise does not find suspicious the fact that a particular healthcare provider expressed plans to perform a healthcare action for the subscriber. Accordingly, the special-purpose application may cause subscriber device 106 to generate and send a subscriber response indicating whether or not the user input indicated that subscriber 114 believes that the VoB request is legitimate. For instance, the special-purpose application may cause subscriber device 106 to send the subscriber response to an API of identity theft protection vendor system 108.

In some examples, identify theft protection vendor system 108 may send one or more messages to subscriber 114 to inform subscriber 114 that there are one or more subscriber alerts for subscriber 114 to review. The messages may include email messages, Short Message Service (SMS) messages, instant messages, application notification messages, or other types of messages. The messages may instruct subscriber 114 to navigate to a user interface that subscriber 114 may use to review and respond to subscriber alerts. For example, a message may provide a link to a website that subscriber 114 may use to review and respond to subscriber alerts. In some examples, the message may instruct or include a link to a special-purpose application that subscriber 114 may use to review and respond to subscriber alerts.

In some examples where subscriber device 106 comprises a telephone (e.g., a mobile telephone) and the identified communication channel for subscriber 114 includes a phone number for subscriber 114, identity theft protection vendor system 108 may make an automated phone call to subscriber device 106. During the automated phone call, identity theft protection vendor system 108 may send voice data that ask subscriber 114 to indicate whether subscriber 114 believes the VoB request to be legitimate. In such examples, the subscriber response may comprise voice data, or tone data corresponding to key presses, indicating whether subscriber 114 believes the VoB request to be legitimate. In some examples, a human operator may make a phone call to a phone number associated with subscriber 114 to notify the subscriber.

In some examples, the identified communication channels for subscriber 114 may include a Short Message Service (SMS) or other type of instant message service. In such examples, identity theft protection vendor system 108 may send an SMS message or other type of instance message to an identified account for subscriber 114. In such examples, subscriber device 106 may send the subscriber response as a reply instant message. In some examples, the instant message sent by identity theft protection vendor system 108 may include selectable hyperlinks corresponding to the VoB request being legitimate and the VoB request not being legitimate. In such examples, subscriber device 106 may send the subscriber response in the form of a hypertext transfer protocol (HTTP) request specifying an address corresponding to the selected hyperlink.

Furthermore, in some examples, the identified communication channels for subscriber 114 may include an email address for subscriber 114 and identity theft protection vendor system 108 may send the subscriber alert as an email message to the email address. In such examples, subscriber 114 may use subscriber device 106 to access their email account and review the email message. In some examples, subscriber device 106 may send the subscriber response as a reply email message. In some examples, the email message sent by identity theft protection vendor system 108 may include selectable hyperlinks corresponding to the VoB request being legitimate and the VoB request not being legitimate. In such examples, subscriber device 106 may send the subscriber response in the form of a hypertext transfer protocol (HTTP) request specifying an address corresponding to the selected hyperlink.

Upon receiving a subscriber response, identity theft protection vendor system 108 may forward the subscriber response to fraud detection system 112 or may otherwise send data to fraud detection system 112 to indicate whether subscriber 114 believes the VoB request to be legitimate. In some examples, identity theft protection vendor system 108 does not forward the subscriber response to fraud detection system 112. Rather, identity theft protection vendor system 108 may perform the actions described elsewhere as being performed by fraud detection system 112 with respect to subscriber responses. In some examples, system 100 does not include identity theft protection vendor system 108. In such examples, subscriber alerts are sent by fraud detection system 112 and may be delivered to subscriber device 106 without the involvement of an identity theft protection vector. The subscriber alerts may be sent to subscriber device 106 in accordance with any of the examples provided elsewhere in this disclosure, and others.

In response to receiving a subscriber response, fraud detection system 112 may determine whether or not the subscriber response indicates that subscriber 114 believes the VoB request to be legitimate. In response to determining that the subscriber response indicates that subscriber 114 believes the VoB request to be legitimate, it may not be necessary for fraud detection system 112 to perform any further action with respect to the VoB request. However, in response to determining that the subscriber response indicates that subscriber 114 believes the VoB request to be illegitimate, fraud detection system 112 may automatically open an investigation of the VoB request. For instance, fraud detection system 112 may assign a task of investigating the VoB request to a human investigator. The human investigator may contact the healthcare provider, subscriber, and/or other persons to obtain more information about the VoB request and determine whether medical identity theft may be occurring. In a less nefarious scenario, the human investigator may determine that the illegitimate VoB request was the result of a typographical error, transcription mistake, inadvertent indication by the subscriber that the VoB request was illegitimate, or other innocent error. In some examples, fraud detection system 112 may automatically send messages (e.g., email messages) requesting particular types of information that may be useful or dispositive in the investigation of the VoB request.

While this system of sending subscriber alerts and receiving subscriber responses is potentially effective in combatting some forms of medical identity theft, this system may result in a significant amount of data being exchanged between insurer computing system 102, subscriber device 106, and, in applicable examples, identity theft protection vendor system 108, which may result in extra consumption of energy (especially by subscriber device 106) and network bandwidth. Additionally, a single visit to a healthcare provider may cause multiple VoB requests to be initiated. For instance, if subscriber 114 visits a hospital and a physician orders medical imaging and a series of lab tests, the hospital may submit a first VoB request, a radiologist performing the medical imaging may submit a second VoB request, and one or more different laboratory testing services performing the series of lab tests may each submit additional VoB requests. Thus, the number of subscriber alerts and subscriber responses may multiply, potentially resulting in more power consumption and network traffic. Additionally, subscribers (e.g., subscriber 114) may quickly be overwhelmed by subscriber alerts. Moreover, some of the subscriber alerts may appear to a subscriber to be associated with illegitimate VoB requests because the subscriber may not recognize the name of healthcare providers that initiated the VoB requests. For instance, the subscriber may not recognize the name of a laboratory testing service used by a physician's office that the subscriber visited. The generation and sending of these subscriber alerts may consume further energy and network bandwidth, hindering the performance of subscriber device 106, insurer computing system 102, and/or identity theft protection vendor system 108.

Additionally, the proliferation of subscriber alerts may desensitize subscribers to subscriber alerts and subscribers may start to ignore the subscriber alerts. The effectiveness of identity theft protection vendor system 108 and/or insurer computing system 102 may be negatively impacted by subscribers failing to respond to subscriber alerts. For instance, significant computing resources of insurer computing system 102 and/or identity theft protection vendor system 108 may be used during processes to resolve medical identity theft cases that are allowed to happen because subscribers did not respond to subscriber alerts, which may hinder the performance of insurer computing system 102 and/or identity theft protection vendor system 108.

This disclosure describes techniques that may address these challenges regarding the performance of insurer computing system 102, subscriber device 106, and/or identity theft protection vendor system 108, while still combatting some forms of medical identity theft. Moreover, the techniques of this disclosure may improve subscriber device 106 by allowing subscriber 114 to more effectively identify illegitimate VoB requests, thus improving the user interface and user experience for subscribers, such as subscriber 114.

As described herein, fraud detection system 112 may send, or instruct identity theft protection vendor system 108 to send, subscriber alerts selectively. In other words, fraud detection system 112 does not necessary initiate a process to send a separate subscriber alert for each VoB request. Instead, fraud detection system 112 may respond to some VoB requests by initiating processes to send subscriber alerts and respond to other VoB requests without initiating processes to send subscriber alerts or receiving subscriber responses. Accordingly, the overall number of subscriber alerts sent may be decreased, which may conserve power and network bandwidth. Additionally, the experience of interacting (albeit indirectly) with fraud detection system 112 may be enhanced from the perspective of subscribers. Various examples of how fraud detection system 112 may determine whether a subscriber alert is to be sent are described herein.

Figure 2:
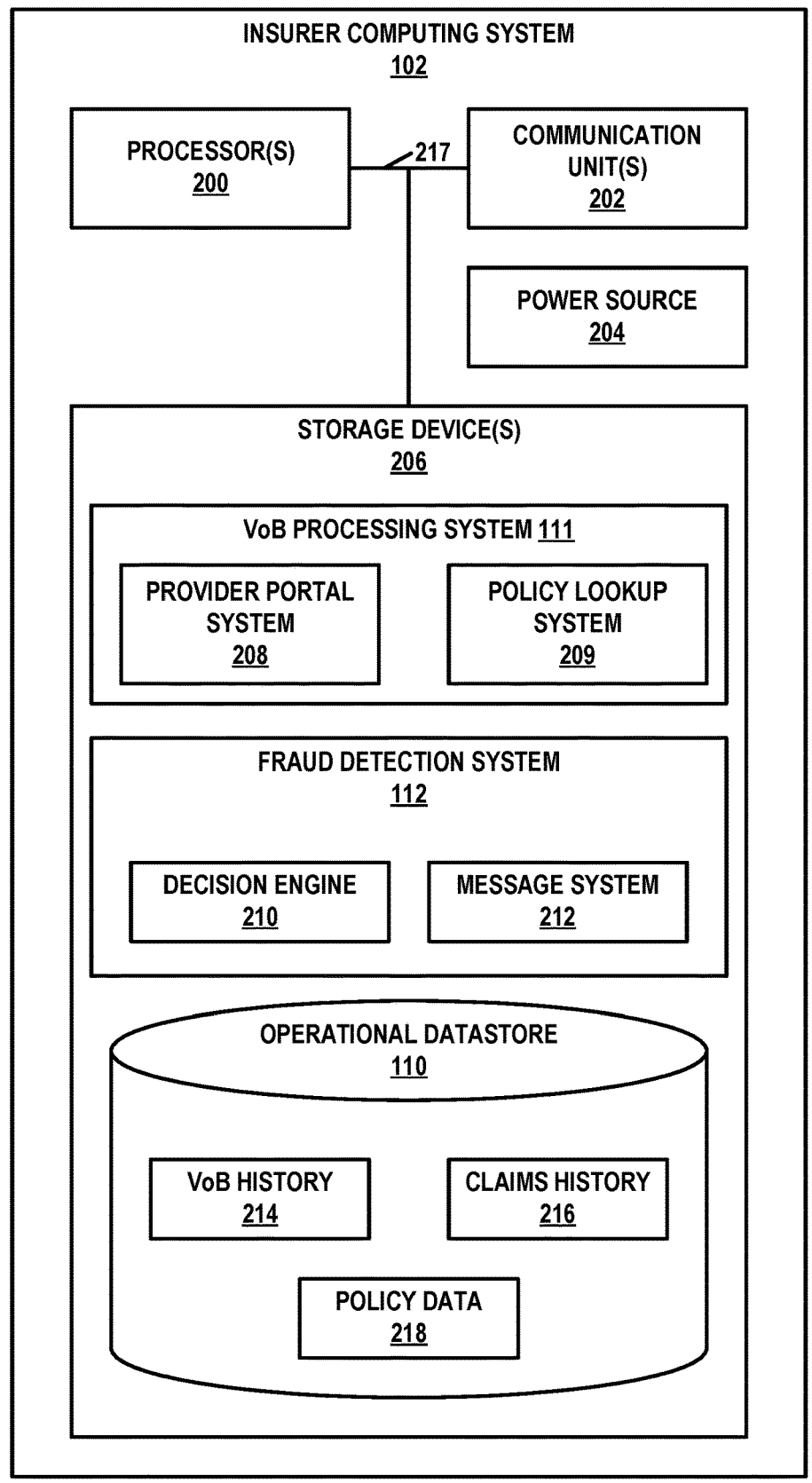
FIG. 2 is a block diagram illustrating example components of an insurer computing system in accordance with one or more aspects of this disclosure.

FIG. 2 is a block diagram illustrating example components of an insurer computing system in accordance with one or more aspects of this disclosure. FIG. 2 illustrates only one particular example of insurer computing system 102, without limitation on many other example configurations of insurer computing system 102.

As shown in the example of FIG. 2, insurer computing system 102 includes one or more processor(s) 200, one or more communication unit(s) 202, a power source 204, one or more storage device(s) 206, and one or more communication channels 217. Insurer computing system 102 may include other components. For example, insurer computing system 102 may include input devices, output devices, display screens, and so on. Communication channel(s) 217 may interconnect each of components 200, 202, and 206 for inter-component communications (physically, communicatively, and/or operatively). In some examples, communication channel(s) 217 may include a system bus, a network connection, an inter-process communication data structure, or any other method for communicating data. Power source 204 may provide electrical energy to components 200, 202, and 206. Storage device(s) 206 may store information required for use during operation of insurer computing system 102.

Processor(s) 200 comprises circuitry configured to perform processing functions. For instance, one or more of processor(s) 200 may be a microprocessor, application-specific integrated circuit (ASIC), field-programmable gate array (FPGA), or other type of processing circuit. In some examples, processor(s) 200 of insurer computing system 102 read and may execute instructions stored by storage device (s) 206.

Communication unit(s) 202 may enable insurer computing system 102 to send data to and receive data from one or more other computing devices (e.g., via a communications network, such as a local area network or the Internet). For instance, communication unit(s) 202 may be configured to receive and send VoB requests, VoB responses, subscriber requests, subscriber responses, and so on. In some examples, communication unit(s) 202 may include wireless transmitters and receivers that enable insurer computing system 102 to communicate wirelessly with the other computing devices. Examples of communication unit(s) 202 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Insurer computing system 102 may use communication unit(s) 202 to communicate with one or more other computing devices or systems, such as healthcare provider computing system 104 (FIG. 1), identity theft protection vendor system 108, and subscriber device 106.

Storage device(s) 206 may store operational datastore 110. In the example of FIG. 2, operational datastore 110 may include a VoB history 214, a claims history 216, policy data 218, and other data. VoB history 214 may include records of VoB requests received by insurer computing system 102 and, in some examples, the VoB responses submitted by insurer computing system 102. For example, VoB history 214 may include records, such as a record indicating that a VoB request was received on Apr. 10, 2019 at 11:07 am that was submitted by a particular healthcare provider and identified a particular set of information that identified a particular person. Claims history 216 may include records of claims submitted to the health insurance provider. A record in claims history 216 for a claim may include data indicating types of healthcare actions for which the claim was filed, data indicating a healthcare provider, data indicating an amount of money requested, data indicating a person for whom the claim was submitted, and so on. Policy data 218 may include data that indicate health insurance policies of subscribers, the status of the health insurance policies, dates during which the health insurance policies are active, and/or other information about health insurance policies. For instance, policy data 218 include data indicating that a particular person has a health insurance policy from the health insurance provider and that the health insurance policy is active from date X to date Y.

Processor(s) 200 may read instructions from storage device(s) 206 and may execute instructions stored by storage device(s) 206. Execution of the instructions by processor(s) 200 may configure or cause insurer computing system 102 to provide at least some of the functionality ascribed in this disclosure to insurer computing system 102. As shown in the example of FIG. 2, storage device(s) 206 include computer-readable instructions associated with VoB processing system 111. Furthermore, in the example of FIG. 2, the computer-readable instructions associated with VoB processing system 111 may include computer-readable instructions associated with a provider portal system 208 and a policy lookup system 209. Additionally, in the example of FIG. 2, storage device(s) 206 may include computer-readable instructions associated with fraud detection system 112. The computer-readable instructions associated with fraud detection system 112 may include computer-readable instructions associated with a decision engine 210 and a message system 212.

Provider portal system 208 may enable healthcare providers to submit VoB requests to insurer computing system 102 and receive VoB responses. In some examples, provider portal system 208 comprises a web server system that sends webpage data that healthcare provider computing systems, such as healthcare provider computing system 104 (FIG. 1), may use to display user interfaces that healthcare providers may use to submit VoB requests and receive VoB responses. In some examples, provider portal system 208 provides an Interactive Voice Response (IVR) system that healthcare providers may use to submit VoB requests and receive VoB responses. In some examples, in response to receiving a VoB request, VoB processing system 111 may store a record of the VoB request in VoB history 214.

Policy lookup system 209 of VoB processing system 111 may use data in operational datastore 110 to determine whether a person identified by a VoB request received by provider portal system 208 has an active health insurance policy from the health insurance provider. For instance, policy lookup system 209 may query policy data 218 in operational datastore 110 to determine whether the person identified by the VoB request has an active health insurance policy from the health insurance provider for the applicable dates.

Decision engine 210 may use data in operational datastore 110 to determine whether to send a subscriber alert. In some examples, decision engine 210 may make the determination of whether to send the subscriber alert in response to policy lookup system 209 determining that a subscriber identified by a VoB request has an active health insurance policy from the health insurance provider. Message system 212 may perform some or all of a process of sending subscriber alerts (e.g., sending subscriber alerts directly on communication channels associated with subscribers, instructing identity theft protection vendor system 108 to send subscriber alerts, etc.), and/or receiving subscriber responses.

With respect to determining whether to send subscriber alerts, decision engine 210 may be configured with an intent to minimize sending subscriber alerts that are associated with legitimate VoB requests. In other words, a goal of decision engine 210 may be to only send a subscriber alert when there is sufficient reason to suspect that the associated VoB request is illegitimate. This may help ensure that the subscriber (e.g., a health insurance policyholder, such as subscriber 114 (FIG. 1), who has agreed to receive subscriber alerts) remains vigilant in reviewing subscriber alerts. If the subscriber receives too many subscriber alerts that are associated with legitimate VoB requests, the subscriber may become overwhelmed and/or desensitized and stop reviewing the subscriber alerts, which may increase the success rates of criminals attempting to perform medical identity theft, with the attendant increase in consumption of computational resources to resolve medical identity theft cases. Moreover, the user experience and user interface of subscriber device 106 may be enhanced by providing only subscriber alerts that are likely to be associated with illegitimate VoBs.

Decision engine 210 may be implemented in one or more of various ways. For instance, in one example, decision engine 210 may implement a rule engine. In this example, the rule engine may apply a set of rules to determine whether to send a subscriber alert. The rules may specify conditions under which to send subscriber alerts. The rule engine may access various types of information to evaluate the rules. For instance, in some examples, the rule engine may access a portion of claims history 216 related to a particular time period (e.g., a most recent 12-month period) to determine whether the subscriber identified by the VoB request has been seen by a particular healthcare provider who submitted the VoB request. In this example, a rule may provide that if the subscriber identified by the VoB request has been seen by the particular healthcare provider who submitted the VoB request during the particular time period, the rule engine may make the determination not to send a subscriber alert associated with the VoB request. In this example, the rule may provide that if the subscriber identified by the VoB request has not been seen by the particular healthcare provider who submitted the VoB request during the particular time period, the rule engine may make the determination to send the subscriber alert. The following table lists example rules that may be used by the rule engine.

| Rule | Positive Rule Response |
| --- | --- |
| Subscriber seen by the same healthcare provider within the last 12 months. | No Alert |
| Subscriber filled same prescription in prior 6 months or used same pharmacy in last 6 months | No Alert |
| Subscriber used same pharmacy in the last 6 months | No Alert |

-continued

| Rule | Positive Rule Response |
|---|---|
| Subscriber had same procedure done in prior 6 months. | No Alert |
| Change of address requested for subscriber | Send Alert |
| Subscriber is associated with any opioid prescription or other high theft/fraud drugs | Send Alert |
| When subscriber is a child under 18, send alerts to parent if parent is subscribed to family plan. | Send Alert |
| Health saving account (HSA)/flexible spending account (FSA) payment IF NOT for VoB request with one of the "No Alert" events above. | Send Alert |
| Oncologist visit resulting in additional required procedures/tests. | No Alert for anticipated tests, procedures, prescriptions, etc. |

In some examples, insurer computing system 102 may implement one or more interfaces, such as user interfaces or APIs, that allow users to add, edit, or delete rules used by the rule engine of decision engine 210. For instance, insurer computing system 102 may serve webpages that contain user interfaces for adding, editing, or deleting rules. In some examples, identity theft protection vendor system 108 implements the interfaces. In some examples, a healthcare provider may use such interfaces to add, edit, or delete rules applicable to the healthcare provider. In some examples, users associated with the health insurance provider, subscriber, and/or the identity theft protection vendor may use the interfaces to add, edit, or delete rules.

As one example of why a healthcare provider may be able to add, edit, or delete rules, consider that it is common for a particular healthcare provider to work with a limited, predictable network of follow-on healthcare providers. Each follow-on healthcare provider for the particular healthcare provider performs healthcare actions that follow-on to healthcare actions performed by the particular healthcare provider. For instance, a particular urgent care clinic may always use a radiology practice group that uses the urgent care clinic's space for medical imaging of trauma patients. In addition to the particular healthcare provider submitting a VoB request, the follow-on healthcare providers may also submit VoB requests, which may lead to a proliferation of subscriber alerts. Accordingly, in this example, the particular healthcare provider may use the interfaces to add a rule indicating not the send a subscriber alert to a subscriber in response to a VoB request that identifies the subscriber and a particular follow-on healthcare provider or providers of the particular healthcare provider if VoB history 214 includes a record of a VoB request that identifies the subscriber, identifies the particular healthcare provider, and has a timestamp indicating a time within a given time period (e.g., the last 2 weeks). Thus, the rule may prevent a subscriber alert from being sent in response to the VoB request from the follow-on healthcare provider. More complex rules may use data from claims history 216. For instance, a rule added by a particular healthcare provider may be based on whether or not the particular healthcare provider has submitted a claim for a particular type of healthcare action. In this way, a healthcare provider may provide provider-specific rules that may be difficult or inconvenient for the health insurance provider to discover.

In some examples, rather than using, or in addition to using binary rules that explicitly specify whether or not to send a subscriber alert, the set of rules include point-value rules. Each point-value rule may specify a point value that is awarded if a condition specified by the point-value rule is satisfied. In such examples, decision engine 210 may make the determination to send a subscriber alert if a total of awarded points exceeds a predetermined threshold. For example, using claims data and other data about the subscriber, a rules engine may use a point system with a total points threshold in order to send a subscriber alert. Points based rules could include the distance of the healthcare provider from subscriber's home address (e.g., 10 points if across the country and not in a common vacation/resort area, 4 points if an area where subscriber has previously had an address but no longer does so, and 1 point if in home town), points could also be assigned based upon type of provider (e.g., for a male subscriber of college age, the rules engine may award 10 points if the healthcare provider is a geriatrician or obstetrician-gynecologist, 5 points if a pediatrician, and 1 point if a general practitioner), etc.

In some examples, decision engine 210 may implement a machine learning engine in addition to or as an alternative to the rule engine. The machine learning engine may be implemented using one or more neural networks, support vector machines, or other machine learning models that are trained to classify VoB requests as being legitimate or illegitimate. Input to the machine learning engine may include information regarding a subscriber's health history, age, gender, and care pathways. Other types of input data may include:

VoB requests submitted by a healthcare provider for a subscriber, with the dates and times of the VoB requests
Subscriber name
Subscriber address
Subscriber age
Subscriber gender
Subscriber unique identifier
Names/addresses of healthcare providers that performed healthcare actions for a subscriber (including in-patient and out-patient healthcare actions) for a prior time period (e.g., a prior 24-month period).
Names/addresses of all pharmacies that performed healthcare actions for a subscriber during a time period (e.g., a prior 12-month time period).
Names/addresses of all labs that performed healthcare actions for a subscriber during a time period (e.g., a prior 24-month time period).
Notifications of change of address.
Notifications of flexible spending account (FSA) and/or health savings account (HSA) withdrawals.
Claims history from a larger number of covered lives to generate predictive models that predict future near-term visits based upon the type of specialist initially seen for each individual member/subscriber.
All family members data is also passed for the above.

In some examples, decision engine 210 may use machine learning techniques to train multiple predictive models that are configured to predict sets of follow-on healthcare providers (such as primary care physicians, clinics, specialists, medical testing laboratories, pharmacies, etc.), if any, that are likely to perform follow-on healthcare actions following an initial visit to a particular healthcare provider. The predictive models may be implemented using neural networks or other types of machine learning techniques.

In one example, the predictive models may include a first predictive model that corresponds to a particular oncology office, a second predictive model that corresponds to a particular obstetrics office, and so on. In such examples, if a subscriber has a first appointment at the oncology office, there may be a high likelihood that additional lab tests, procedures, and prescriptions from particular follow-on healthcare providers will be ordered in the course of diagnosing a potential cancer event. Accordingly, the predictive model for the oncology office may predict the set of follow-on healthcare providers. If the initial oncology visit is actually by a subscriber, and not a thief, decision engine 210 may make a determination not to send subscriber alerts in response to VoB requests from the predicted follow-on healthcare providers. To do this, the predictive model for the oncology office may be trained, using historical data regarding patients who visit the oncology office, to indicate a set of follow-on healthcare providers that typically submit VoBs for a patient following an initial visit of the patient to the oncology office. In this example, the follow-on healthcare providers that perform healthcare actions following an initial visit to a particular obstetrician's office may be quite different from the follow-on healthcare providers that perform healthcare actions that follow an initial visit to an oncologist's office.

Decision engine 210 may use these predictive models to determine whether to send subscriber alerts following an initial request for performance of a healthcare action by a healthcare provider. For example, decision engine 210 may receive a first VoB request that identifies a particular patient and that was submitted by a particular oncology office. In this example, decision engine 210 may use a predictive model for the particular oncology office to determine that a particular radiology office is among the follow-on healthcare providers for the particular oncology office. In this example, because this may be the particular patient's first visit to the particular oncology office, decision engine 210 may send a subscriber alert. In this example, when decision engine 210 subsequently receives a second VoB request that identifies the particular patient and that was submitted by one of the follow-on healthcare providers, decision engine 210 may make the determination not to send a subscriber request in response to the second VoB request.

The predictive models may take various types of information as input. For example, the predictive models may take as input an individual subscriber's age, gender, and health history. In some examples, the predictive models for different types of healthcare providers may take different types of input. For instance, the predictive models for oncologists may take different types of input than the predictive models for obstetricians.

In one example, to train a predictive model for a particular oncology office, decision engine 210 may obtain, from operational datastore 110, data regarding claims submitted by the particular oncology office for a given time period (e.g., 36 months). Furthermore, in this example, decision engine 210 may identify each patient that visited the oncology office and combine the identified patients' data into a working data set. Next, decision engine 210 may create cohorts of the identified patients such as the following:

1) Male, age 74+yo
2) Women, age 74+yo
3) Men, age 50 yo-74 yo
4) Women, age 50 yo-74 yo
5) Men, <50 yo
6) Women, <50 yo More refined cohorts may be possible with the assistance of either an oncologist or an epidemiologist by which cohorts of patients may be identified that have additional conditions (e.g. Type II Diabetes, chronic obstructive pulmonary disease (COPD, heart failure, etc.) which predispose the patients to particular types of cancers. Furthermore, for each cohort, decision engine 210 may identify each patients' first visit to the particular oncology office. Decision engine 210 may then time align those points in time and use a predictive model for the particular oncology office to determine the most likely follow-on healthcare providers (e.g., the top 5-10 most likely follow-on healthcare providers) for each cohort type by provider type and duration of time after the initial oncology visit. This may then become a profile of expected healthcare providers that decision engine 210 uses to compare future VoB requests for the subscriber.

For instance, in this example, when a subscriber is a 65-year old female, decision engine 210 may compare applicable VoB requests with VoB requests for subscribers in cohort 4, above. In this example, the applicable VoB requests are VoB requests in VoB history 214 that identify the subscriber and have timestamps indicating times after the subscriber's initial visit to the particular oncology office. In this example, if the subscriber has a VoB request submitted by a particular oncology office, if fewer than x number of days have passed following the subscriber's initial visit to the particular oncology office, and if a newly-received VoB request was submitted by a follow-on healthcare provider identified by the predictive model for the particular oncology office when given the cohort of the subscriber as input, decision engine 210 may make a determination not to send a subscriber alert in response to the newly-received VoB request.

Decision engine 210 may perform the same or similar processes for other disease categories and/or types of healthcare providers, by which an initial diagnosis/referral may trigger many additional appointments and treatments. Examples may include pregnancy, heart failure, COPD, transplant patient, and so on. Decision engine 210 may apply the various profiles of anticipated follow-on healthcare provider visits and timing of an initial event to a subscriber for the cohorts to which the subscriber belongs to minimize the number of alerts that the subscriber receives after an initial visit to a new healthcare provider that would trigger multiple additional visits at other healthcare providers.

In some examples, rather than predictive models specific to individual healthcare providers that predict individual follow-on healthcare providers, decision engine 210 may additionally or alternatively use predictive models specific to individual types of healthcare providers that predict types of follow-on healthcare providers. In such examples, decision engine 210 may use such models in much the same way as set forth above. Thus, if a predictive model for oncology determines for a subscriber that some radiologist will provide follow-on healthcare services, decision engine 210 may make a determination not to send a subscriber alert in response to a VoB request submitted by a radiologist that identifies the subscriber.

Figure 3:
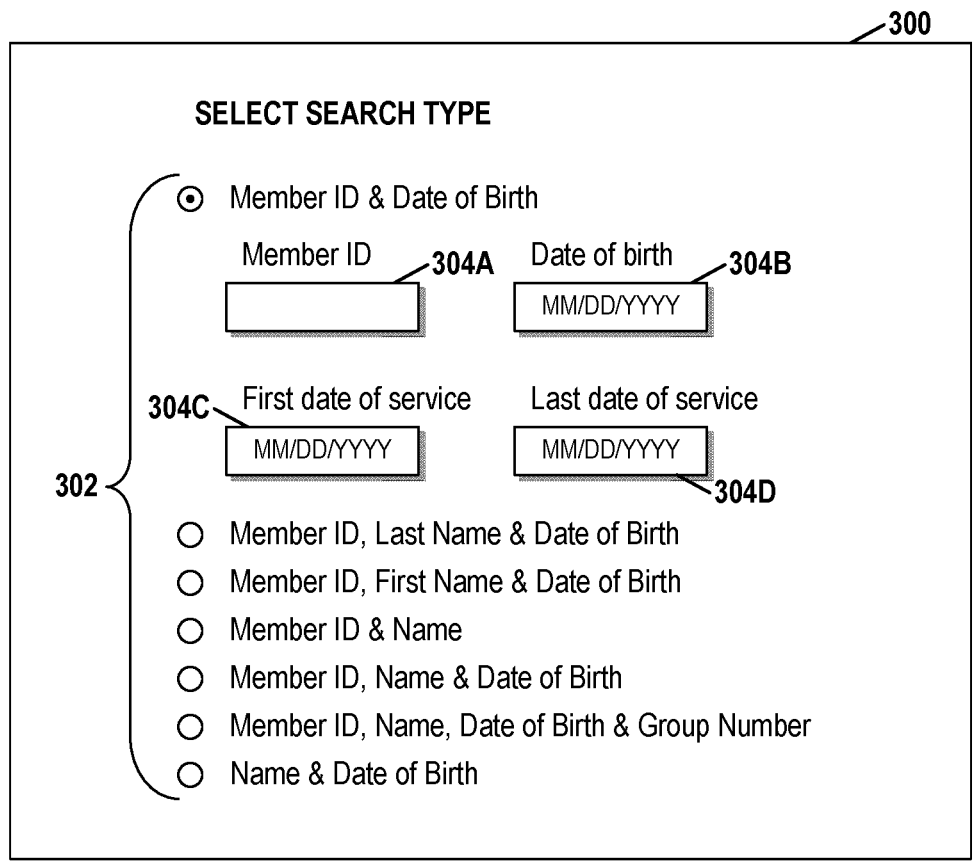
FIG. 3 is a conceptual diagram of an example user interface for submitting a verification of benefits (VoB) request in accordance with one or more aspects of this disclosure.

FIG. 3 is a conceptual diagram of an example user interface 300 for submitting a VoB request in accordance with one or more aspects of this disclosure. Healthcare provider computing system 104 may output user interface 300 for display. For instance, in some examples, a web browser application of healthcare provider computing system 104 may receive webpage data from provider portal system 208 (FIG. 2) and render the webpage data to generate user interface 300. In other examples, user interface 300 may be a native interface of a software application running on healthcare provider computing system 104.

In the example of FIG. 3, user interface 300 includes a set of radio buttons 302. Each of the radio buttons 302 corresponds to a different combination of data that a user may input to identify a person seeking performance of a healthcare action. In the example of FIG. 3, the radio button labeled "Member ID & Date of Birth" is selected. Accordingly, user interface 300 displays data input features 304A-304D (collectively, "data input features 304") that enable the user to input a member identification number ("Member ID"), a date of birth, a first date of service, and a last date of service. The member identification number may be a number that identifies a health insurance policy. The first date of service feature and the last date of service feature may accept user input indicating a first date on which the healthcare provider expects to perform healthcare actions for the person and a last date on which the healthcare provider expects to perform healthcare actions for the person. In situations where the last date on which the healthcare provider expects to perform healthcare actions for the person is later in time than the first date on which the healthcare provider expects to perform healthcare actions for the person, the healthcare provider may want to know that the person has an active health insurance policy throughout the entire time period between these two dates. After receiving indications of user input for each of data input features 304, healthcare provider computing system 104 may send a VoB request that includes the data entered into data input features 304.

Figure 4:
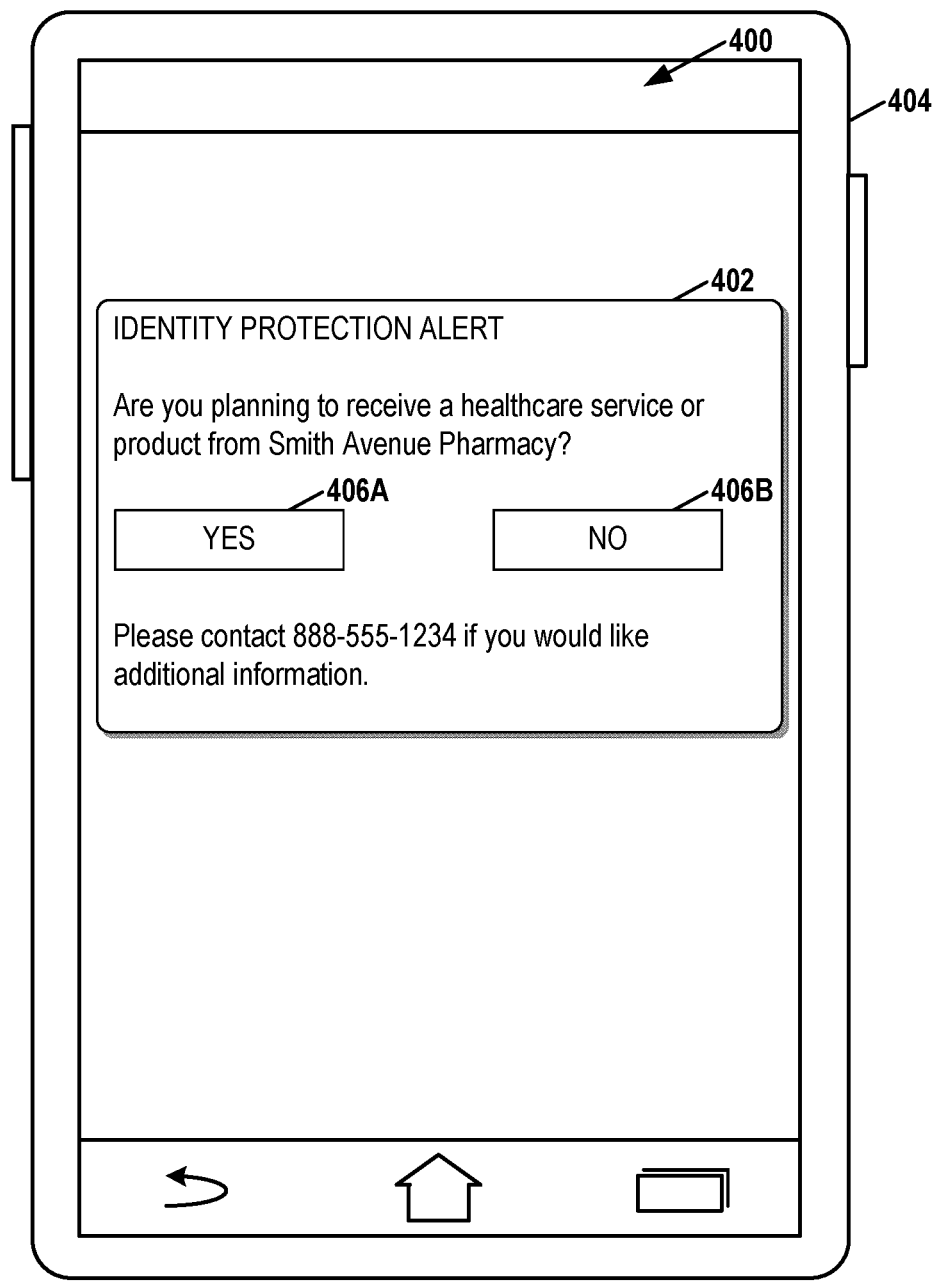
FIG. 4 is a conceptual diagram of an example user interface containing a subscriber alert notification, in accordance with one or more aspects of this disclosure.

FIG. 4 is a conceptual diagram of an example user interface 400 containing a subscriber alert notification 402, in accordance with one or more aspects of this disclosure. In the example of FIG. 4, a mobile phone 404 outputs user interface 400 for display. Mobile phone 404 may be one example of subscriber device 106 (FIG. 1).

Mobile phone 404 may output subscriber alert notification 402 in response to receiving a subscriber alert, e.g., from identity theft protection vendor system 108 (FIG. 1), insurer computing system 102, or another computing system. In some examples, a special-purpose application running on mobile phone 404 may cause mobile phone 404 to output subscriber alert notification 402 for display. In other examples, an operating system of mobile phone 404 may cause mobile phone 404 to output subscriber alert notification 402 for display even if the special-purpose application is not running.

As shown in the example of FIG. 4, subscriber alert notification 402 includes text that indicates the subject matter of subscriber alert notification 402. This text may include text that identifies a healthcare provider that submitted a VoB request associated with the subscriber alert. In the example of FIG. 4, the healthcare provider is "Smith Avenue Pharmacy." Additionally, subscriber alert notification 402 includes buttons 406A and 406B (collectively, "buttons 406"). Mobile phone 404 may receive an indication of user input directed to either of buttons 406. In response to receiving an indication of user input directed to one of buttons 406, mobile device 404 may generate and send a subscriber response, e.g., to identity theft protection vendor system 108 (FIG. 1), insurer computing system 102, or another computing system. The subscriber response may indicate that a user of mobile device 404 (e.g., subscriber 114) believes that the associated VoB request is legitimate if mobile device 404 receives an indication of user input to select button 406A. The subscriber response may indicate that the user of mobile device 404 (e.g., subscriber 114) believes that the associated VoB request is illegitimate if mobile device 404 receives an indication of user input to select button 406B. Additionally, in the example of FIG. 4, subscriber alert notification 402 may include a phone number or other contact information that the subscriber may use to get more information about the subscriber alert. In some examples, the phone number may be associated with an interactive voice response system of an identity theft protection vendor or a healthcare insurance provider.

Figure 5:
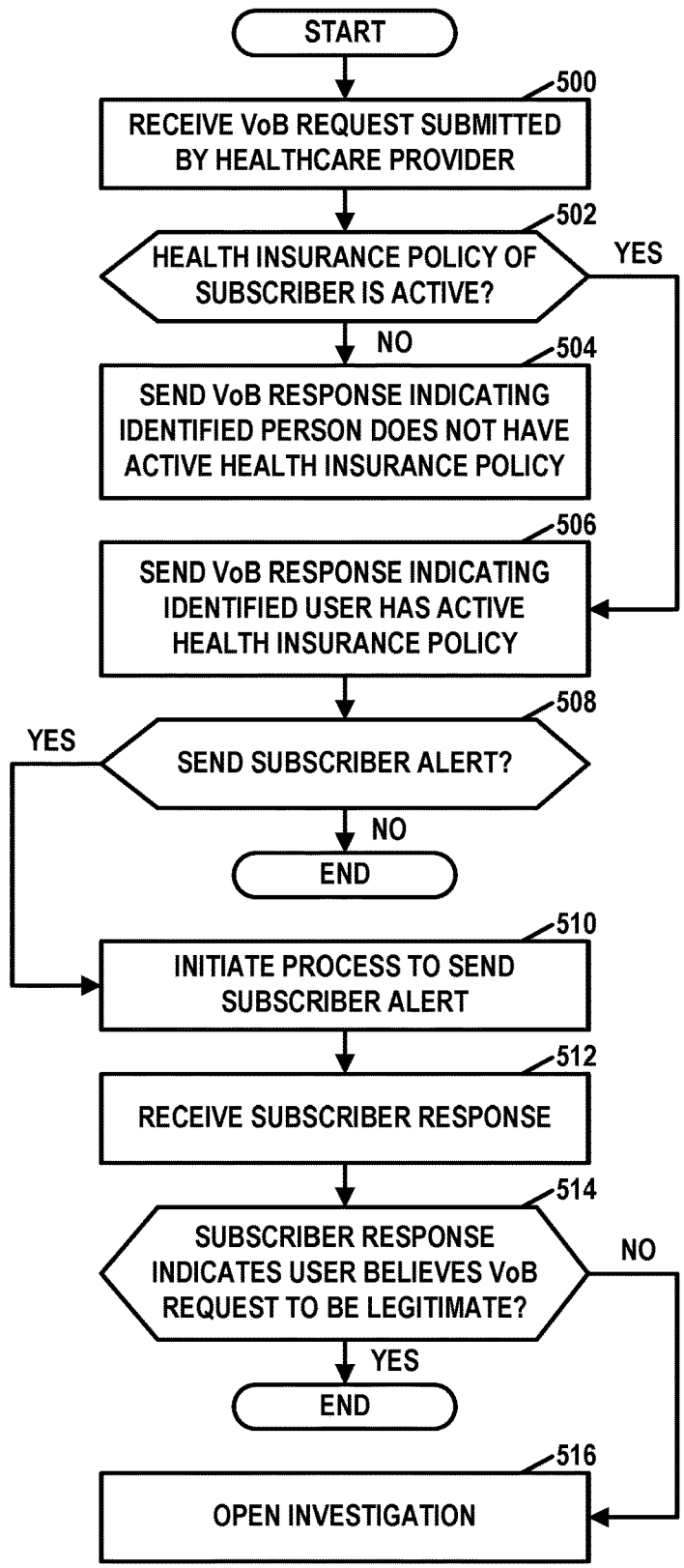
FIG. 5 is a flowchart illustrating a first example operation in accordance with one or more aspects of this disclosure.

FIG. 5 is a flowchart illustrating a first example in accordance with one or more aspects of this disclosure. The operations shown in the flowcharts of this disclosure are provided as examples. In other examples, operations may include more, fewer, or different actions, and/or actions may be performed in different orders. FIG. 5 is explained with reference to FIG. 1 and FIG. 2. However, in other examples, the actions described in FIG. 5 may be performed in other contexts and by other components.

In the example of FIG. 5, insurer computing system 102 may receive, via a communication network, a VoB request that was submitted by a healthcare provider and that identifies a subscriber (FIG. 1) (500). The VoB request may comprise a request for insurer computing system 102 to verify that a health insurance policy of the subscriber is active. In response to receiving the VoB request, policy lookup system 209 of VoB processing system 111 of insurer computing system 102 may determine whether a health insurance policy of the identified subscriber is active (502). For instance, policy lookup system 209 may execute a database query against policy data 218 to retrieve data indicating whether the identified subscriber has a health insurance policy from the health insurance provider and, if so, whether that health insurance policy is active.

In response to determining that the identified subscriber does not have an active health insurance policy from the health insurance provider ("NO" branch of 502), VoB processing system 111 may send a VoB response to healthcare provider computing system 104 indicating that the identified subscriber does not have an active health insurance policy from the health insurance provider (504). On the other hand, in response to determining that the identified subscriber has an active health insurance policy from the health insurance provider ("YES" branch of 502), VoB processing system 111 may send a VoB response to healthcare provider computing system 104 indicating that the identified subscriber has an active health insurance policy from the health insurance provider (506). Thus, VoB processing system 111 may provide a VoB response to healthcare provider computing system 104 that indicates whether the health insurance policy of the subscriber is active.

Additionally, in the example of FIG. 5, decision engine 210 of fraud detection system 112 may determine whether to send a subscriber alert (508). The subscriber alert may notify the subscriber that the healthcare provider has been requested to perform a healthcare action for the subscriber in the future as of a time the healthcare provider submitted the VoB request. Decision engine 210 may make the determination of whether to send the subscriber alert in accordance with any of the examples provided elsewhere in this disclosure, or others. For instance, in some examples, decision engine 210 may apply a set of rules to determine whether to send the subscriber alert. In some such examples, decision engine 210 may receive one or more of the rules from the healthcare provider.

In some examples, as part of determining whether to send the subscriber alert, decision engine 210 may select a predictive model that corresponds to the healthcare provider. For instance, decision engine 210 may determine which of the predictive models is explicitly associated with the healthcare provider or is associated with a type of healthcare provider to which the healthcare provider belongs. Additionally, decision engine 210 may apply the predictive model to determine a set of follow-on healthcare providers. Decision engine 210 may then determine whether the VoB request was submitted by one of the follow-on healthcare providers. Decision engine 210 may then make the determination whether to send the subscriber response in response to determining that the VoB request was not submitted by one of the follow-on healthcare providers. In some such examples, as part of determining whether to send the subscriber alert, decision engine 210 may determine a cohort to which the subscriber belongs and, as part of applying the predictive model, decision engine 210 may provide information indicating the determined cohort as input to the predictive model. Furthermore, in some examples, the predictive model that corresponds to the healthcare provider may be considered a first predictive model, a plurality of predictive models may include the first predictive model, and each of the plurality models may correspond to a different healthcare provider. In some such examples, decision engine 210 may, for each respective predictive model of the plurality of predictive models, train the respective predictive model to identify a set of follow-on healthcare providers for the healthcare provider corresponding to the respective predictive model. Decision engine 210 may train the respective predictive model to identify the set of follow-on providers using a back-propagation algorithm that adjusts weights of inputs to artificial neurons of the respective model based on differences between output generated by the respective predictive model and expected output when provided sets of training data are input.

In response to decision engine 210 making a determination not to send a subscriber alert ("NO" branch of 508), the operation of FIG. 5 may end. However, in response to decision engine 210 making a determination to send a subscriber alert ("YES" branch of 508), message system 212 may initiate a process to send a subscriber alert to the subscriber (510). In some examples, the process to send the subscriber alert may include identifying one or more communication channels for the subscriber. Furthermore, the process to send the subscriber alert may include sending the subscriber alert via the one or more identified communication channels for the subscriber, or instructing one or more third-party computing systems (e.g., identity theft protection vendor system 108) to send the subscriber alert via the one or more identified communication channels. In some examples, the process to send the subscriber alert may include instructing an identity theft protection vendor system (e.g., identity theft protection vendor system 108) to send the subscriber alert. In some examples, the process to send the subscriber alert may include sending the subscriber alert to a mobile device (e.g., subscriber device 106) associated with the subscriber.

Furthermore, after initiating the process to send the subscriber alert, message system 212 may receive a subscriber response that is responsive to the subscriber alert (512). For instance, message system 212 may receive the subscriber response from identity theft protection vendor system 108, from subscriber device 106, or from another device. The subscriber response may indicate whether the subscriber believes the VoB request to be legitimate.

After message system 212 receives the subscriber response, message system 212 may determine whether the subscriber response indicates that the subscriber believes the VoB request to be legitimate (514). In response to message system 212 determining that the subscriber response indicates that the subscriber believes the VoB request to be legitimate ("YES" branch of 514), fraud detection system 112 may end the operation of FIG. 5. In some examples, fraud detection system 112 may end the operation of FIG. 5 if message system 212 does not receive a subscriber response. However, in response to message system 212 determining that the subscriber response indicates that the subscriber believes the VoB request to be illegitimate ("NO" branch of 514), fraud detection system 112 may open an investigation of the VoB request (516). For instance, in one example, fraud detection system 112 may automatically generate a work item for a human investigator.

Completing the work item may involve the human investigator following up with the healthcare provider, subscriber, and/or other parties to determine whether the VoB request is in fact legitimate. For instance, the human investigator may call the healthcare provider to check whether the healthcare provider entered correct information in the VoB request because a common problem is that healthcare providers may make typographical errors when submitting VoB requests. In some examples, the human investigator may advise the healthcare provider that a person is potentially attempting to steal another person's medical identity. In some examples, as part of the investigation, fraud detection system 112 may automatically request certain types of information (e.g., from a representative of the healthcare provider, from the subscriber, etc.) regarding the VoB request. In some examples, rather than actions (512) through (516) being performed at insurer computing system 102, identity theft protection vendor system 108 may perform actions (512) through (516).

Figure 6:
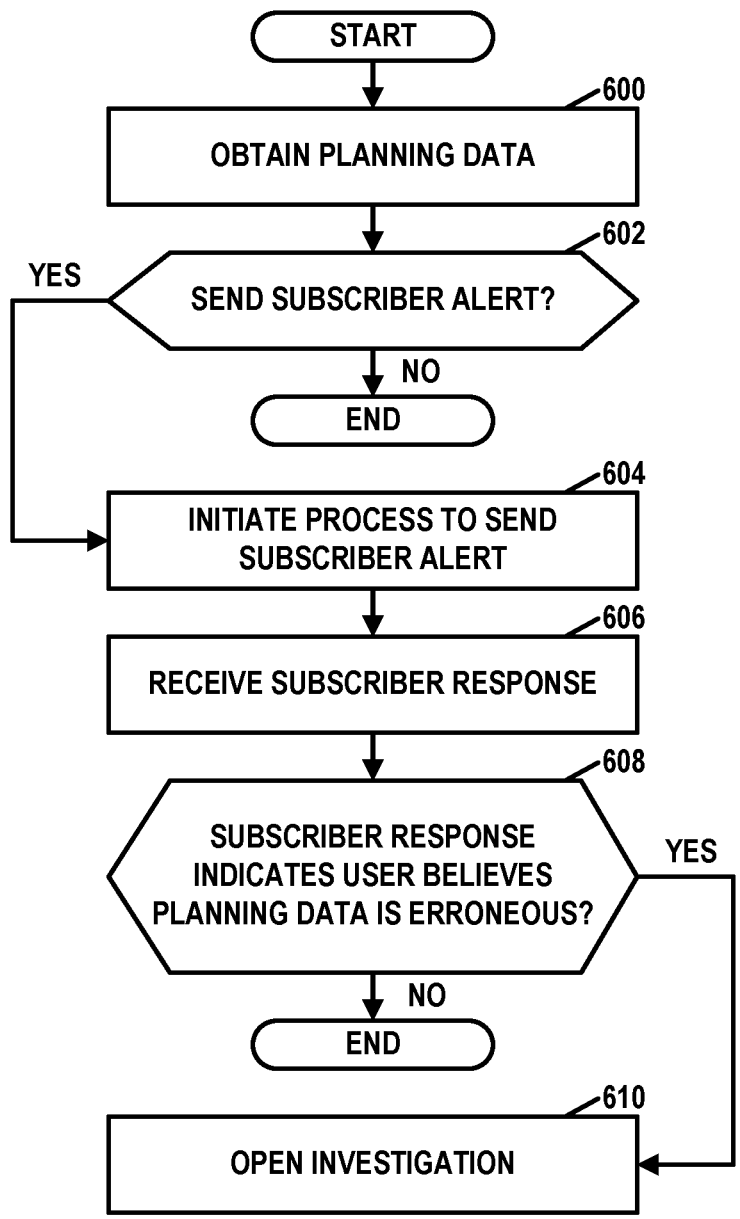
FIG. 6 is a flowchart illustrating a second example operation in accordance with one or more aspects of this disclosure.

FIG. 6 is a flowchart illustrating a second example operation in accordance with one or more aspects of this disclosure. Although much of this disclosure has applied to VoB requests and VoB responses, similar processes can be driven based on other types of data that indicate that a healthcare provider is planning to perform a healthcare action for a subscriber.

Particularly, in the example of FIG. 6, fraud detection system 112 may obtain planning data that indicates that a healthcare provider is planning to perform a healthcare action for a subscriber (600). For instance, fraud detection system 112 may obtain appointment data indicating that the healthcare provider has scheduled an upcoming appointment for the subscriber. For instance, fraud detection system 112 may obtain appointment data indicating that the subscriber has an appointment at a particular ophthalmologist's office on Apr. 11, 2019 at 3:30 pm. Fraud detection system 112 may obtain the appointment data in any of various ways. For instance, in one example, data regarding upcoming appointments may be stored in electronic medical records (EMR) of patients. In this example, fraud detection system 112 may obtain the EMRs, or portions thereof, of patients from one or more EMR hosting services and extract the appointment data. In some examples, fraud detection system 112 may obtain the appointment data directly from appointment management systems of healthcare providers. In some examples, fraud detection system 112 may obtain the appointment data from data aggregation systems that license appointment data from healthcare providers, EMR hosting service, or other parties. In some examples, VoB requests may be considered a type of planning data.

In some examples, such as examples where fraud detection system 112 is implemented by the identity theft protection vendor instead of the health insurance provider, fraud detection system 112 may be able to obtain appointment data but not VoB requests for some subscribers of an identity theft protection service provided by the identity theft protection vendor. For instance, identity theft protection vendor may not have arrangements in place with these subscribers' health insurance providers to obtain VoB requests. However, for other subscribers of the identity theft protection service, fraud detection system 112 may be able to obtain VoB requests.

In response to obtaining planning data indicating that a healthcare provider is planning to perform a healthcare action for the subscriber, decision engine 210 may determine whether to send a subscriber alert (602). For instance, decision engine 210 may determine whether to send a subscriber alert in response to obtaining appointment data indicating that the healthcare provider has scheduled an appointment for the subscriber. Decision engine 210 may determine whether to send the subscriber alert in much the same way described elsewhere in this disclosure. In some examples, decision engine 210 may use different sets of rules, different scoring systems, and/or different machine learning models depending on whether the determination is being made based on a VoB request, appointment data, or another type of planning data.

Accordingly, in response to making a determination not to send the subscriber alert ("NO" branch of 602), the operation of FIG. 6 may end with respect to the appointment. On the other hand, in response to making the determination to send the subscriber alert ("YES" branch of 602), message system 212 may initiate a process to send the subscriber alert to the subscriber (604) and may subsequently receive a subscriber response (606). Message system 212 may initiate the process to send the subscriber alert to the subscriber and may receive the subscriber response in any of the ways as described elsewhere in this disclosure.

Furthermore, in the example of FIG. 6, fraud detection system 112 may determine whether the subscriber response indicates that the subscriber believes that planning data is erroneous (608). If the subscriber response indicates that the subscriber believes the planning data is not erroneous ("NO" branch of 608), the operation of FIG. 6 may end with respect to the planning data. However, if the subscriber response indicates that the subscriber believes the planning data is erroneous ("YES" branch of 608), fraud detection system 112 may automatically open an investigation (610). Fraud detection system 112 may automatically open the investigation in accordance with any of the examples provided elsewhere in this disclosure, or others. In some examples, rather than actions (606) through (610) being performed at insurer computing system 102, identity theft protection vendor system 108 may perform actions (606) through (610).

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

The following paragraphs provide a non-limiting list of examples in accordance with techniques of this disclosure.

Example 1. A method comprising: receiving, by a computing system, via a communications network, a VoB request that was submitted by a healthcare provider and that identifies a subscriber, the VoB request comprising a request for the computing system to verify that a health insurance policy of the subscriber is active; in response to receiving the VoB request: determining, by the computing system, whether a health insurance policy of the identified subscriber is active; and providing, by the computing system, a VoB response to the healthcare provider, the VoB response indicating whether the health insurance policy of the subscriber is active; and in response to determining that the health insurance policy of the identified subscriber is active: determining, by the computing system, whether to send a subscriber alert to the subscriber, wherein the subscriber alert notifies the subscriber that the healthcare provider has been requested to perform a healthcare action for the subscriber in the future as of a time the healthcare provider submitted the VoB request; and based on a determination to send the subscriber alert, initiating, by the computing system, a process to send the subscriber alert to the subscriber.

Example 2. The method of example 1, further comprising: receiving, by the computing system, a subscriber response that is responsive to the subscriber alert, the subscriber response indicating whether the subscriber believes that the VoB request is legitimate; and based on the subscriber response indicating that the subscriber believes that VoB request is not legitimate, opening, by the computing system, an investigation of the VoB request.

Example 3. The method of any of examples 1-2, wherein determining whether to send the alert comprises applying, by the computing system, a set of rules to determine whether to send the subscriber alert.

Example 4. The method of example 3, further comprising receiving, by the computing system, one or more of the rules from the healthcare provider.

Example 5. The method of any of examples 1-4, wherein determining whether to send the subscriber alert comprises: selecting, by the computing system, a predictive model that corresponds to the healthcare provider; applying, by the computing system, the predictive model to determine a set of follow-on healthcare providers; determining, by the computing system, whether the VoB request was submitted by one of the follow-on healthcare providers; and making, by the computing system, the determination to send the subscriber response in response to determining that the VoB request was not submitted by one of the follow-on healthcare providers.

Example 6. The method of example 5, wherein: determining whether to send the subscriber alert further comprises determining, by the computing system, a cohort to which the subscriber belongs, and applying the predictive model comprises providing information indicating the determined cohort as input to the predictive model.

Example 7. The method of any of examples 5 or 6, wherein: the predictive model that corresponds to the healthcare provider is a first predictive model, a plurality of predictive models includes the first predictive model, each of the plurality models corresponds to a different healthcare provider, the method further comprises, for each respective predictive model of the plurality of predictive models, training, by the computing system, the respective predictive model to identify a set of follow-on healthcare providers for the healthcare provider corresponding to the respective predictive model.

Example 8. The method of any of examples 1-7, wherein the process to send the subscriber alert comprises instructing, by the computing system, an identity theft protection vendor system to send the subscriber alert.

Example 9. The method of any of examples 1-8, wherein the process to send the subscriber alert comprises sending the subscriber alert to a mobile device associated with the subscriber.

Example 10. A computing system comprising: a set of one or more communication units configured to receive, via a communications network, a VoB request that was submitted by a healthcare provider and that identifies a subscriber, the VoB request comprising a request for the computing system to verify that a health insurance policy of the subscriber is active; and one or more processors configured to: in response to receiving the VoB request: determine whether a health insurance policy of the identified subscriber is active; and provide a VoB response to the healthcare provider, the VoB response indicating whether the health insurance policy of the subscriber is active; and in response to determining that the health insurance policy of the identified subscriber is active: determine whether to send a subscriber alert to the subscriber, wherein the subscriber alert notifies the subscriber that the healthcare provider has been requested to perform a healthcare action for the subscriber in the future as of a time the healthcare provider submitted the VoB request; and based on a determination to send the subscriber alert, initiate a process to send the subscriber alert to the subscriber.

Example 11. The computing system of example 10, wherein: the one or more communication units are further configured to receive a subscriber response that is responsive to the subscriber alert, the subscriber response indicating whether the subscriber believes that the VoB request is legitimate, and the one or more processors are configured to open an investigation of the VoB request based on the subscriber response indicating that the subscriber believes that VoB request is not legitimate.

Example 12. The computing system of example 11, wherein the one or more processors are configured such that, as part of determining whether to send the alert, the one or more processors apply a set of rules to determine whether to send the subscriber alert.

Example 13. The computing system of example 12, wherein the one or more communication units are further configured to receive one or more of the rules from the healthcare provider.

Example 14. The computing system of any of examples 10-13, wherein the one or more processors are configured such that, as part of determining whether to send the subscriber alert, the one or more processors: select a predictive model that corresponds to the healthcare provider; apply the predictive model to determine a set of follow-on healthcare providers; determine whether the VoB request was submitted by one of the follow-on healthcare providers; and make the determination to send the subscriber response in response to determining that the VoB request was not submitted by one of the follow-on healthcare providers.

Example 15. The computing system of example 14, wherein: the one or more processors are configured such that, as part of determining whether to send the subscriber alert, the one or more processors determine a cohort to which the subscriber belongs, and the one or more processors are configured such that, as part of applying the predictive model, the one or more processors provide information indicating the determined cohort is input to the predictive model.

Example 16. The computing system of any of examples 14-15, wherein: the predictive model that corresponds to the healthcare provider is a first predictive model, a plurality of predictive models includes the first predictive model, each of the plurality models corresponds to a different healthcare provider, for each respective predictive model of the plurality of predictive models, the one or more processors are configured to train the respective predictive model to identify a set of follow-on healthcare providers for the healthcare provider corresponding to the respective predictive model.

Example 17. The computing system of any of examples 10-16, wherein the process to send the subscriber alert comprises sending, by the one or more communication units, instructions to an identity theft protection vendor system to send the subscriber alert.

Example 18. The computing system of any of examples 10-17, wherein the process to send the subscriber alert comprises sending the subscriber alert to a mobile device associated with the subscriber.

Example 19. The computing system of any of examples 10-18, further comprising one or more subscriber devices configured to receive subscriber alerts.

Example 20. The computing system of any of examples 10-19, further comprising one or more healthcare provider computing systems configured to submit VoB requests to insurer computing system 102.

Example 21. A non-transitory computer-readable storage medium having instructions stored thereon that, when executed, configure a computing system to: receive, via a communications network, a VoB request that identifies a subscriber and a healthcare provider that submitted the VoB request, the VoB request comprising a request for the computing system to verify that a health insurance policy of the subscriber is active; in response to receiving the VoB request: determine whether a health insurance policy of the identified subscriber is active; and provide a VoB response to the healthcare provider, the VoB response indicating whether the health insurance policy of the subscriber is active; and in response to determining that the health insurance policy of the identified subscriber is active: determine whether to send a subscriber alert to the subscriber, wherein the subscriber alert notifies the subscriber that the healthcare provider has been requested to perform a healthcare action for the subscriber in the future as of a time the healthcare provider submitted the VoB request; and based on a determination to send the subscriber alert, initiate a process to send the subscriber alert to the subscriber.

Example 22. The non-transitory computer-readable storage medium of examples 21 or 22, where execution of the instructions causes the computing system to perform the methods of any of examples 2-10.

Example 23. A computing system comprising: means for receiving, via a communications network, a VoB request that identifies a subscriber and a healthcare provider that submitted the VoB request, the VoB request comprising a request for the computing system to verify that a health insurance policy of the subscriber is active; means for determining, in response to receiving the VoB request, whether a health insurance policy of the identified subscriber is active and providing a VoB response to the healthcare provider, the VoB response indicating whether the health insurance policy of the subscriber is active; means for determining, in response to determining that the health insurance policy of the identified subscriber is active, whether to send a subscriber alert to the subscriber, wherein the subscriber alert notifies the subscriber that the healthcare provider has been requested to perform a healthcare action for the subscriber in the future as of a time the healthcare provider submitted the VoB request; and means for initiating, based on a determination to send the subscriber alert, a process to send the subscriber alert to the subscriber.

Example 24. The computing system of example 23, further comprising means for performing the methods of any of examples 2-9.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:

receiving, by a computing system, via a communications network, a verification of benefits (VoB) request that was submitted by a healthcare provider and that identifies a subscriber, the VoB request comprising a request for the computing system to verify that a health insurance policy of the subscriber is active;

in response to receiving the VoB request:
 determining, by the computing system, whether the health insurance policy of the subscriber is active; and
 providing, by the computing system, a VoB response to the healthcare provider, the VoB response indicating whether the health insurance policy of the subscriber is active;

identifying, by the computing system, a communication channel that is specific to the subscriber from among a plurality of communication channels, wherein identifying the communication channel comprises accessing a database that maps a plurality of subscribers to the communication channels, wherein the subscribers comprise the subscriber, and the communication channel is one of a special-purpose application installed on a mobile phone of the subscriber, an email account of the subscriber, an instant message account of the subscriber, a phone number of the subscriber, or a mobile device associated with the subscriber; and in response to determining that the health insurance policy of the subscriber is active and prior to the healthcare provider performing a healthcare action:
 determining, by the computing system, whether to send a subscriber alert to the subscriber, wherein the subscriber alert notifies the subscriber that the healthcare provider has been requested to perform the healthcare action for the subscriber in the future as of a time the healthcare provider submitted the VoB request, wherein determining whether to send the subscriber alert comprises:
  selecting, by the computing system, a predictive model that corresponds to the healthcare provider;
  applying, by the computing system, the predictive model to determine a first set of follow-on healthcare providers;
  determining, by the computing system, whether the VoB request was submitted by one of the first set of follow-on healthcare providers; and determining, by the computing system, to send the subscriber response in response to determining that the VoB request was not submitted by one of the first set of follow-on healthcare providers; and based on a determination to send the subscriber alert:
sending, by the computing system, the subscriber alert to the subscriber via the communication channel, or
instructing, by the computing system, another computing system to send the subscriber alert to the subscriber via the communication channel.

2. The method of claim 1, further comprising:
receiving, by the computing system, a subscriber response that is responsive to the subscriber alert, the subscriber response indicating whether the subscriber believes that the VoB request is legitimate; and
based on the subscriber response indicating that the subscriber believes that the VoB request is not legitimate, opening, by the computing system, an investigation of the VoB request.

3. The method of claim 1, wherein:
determining whether to send the subscriber alert further comprises determining, by the computing system, a cohort to which the subscriber belongs, and
applying the predictive model comprises providing information indicating the determined cohort as input to the predictive model.

4. The method of claim 1, wherein:
the predictive model that corresponds to the healthcare provider is a first predictive model,
a plurality of predictive models comprises the first predictive model,
each of the predictive models corresponds to a respective healthcare provider among a plurality of healthcare providers comprising the healthcare provider, and
the method further comprises, for each respective predictive model of the predictive models, training, by the computing system, the respective predictive model to identify a respective set of follow-on healthcare providers for the respective healthcare provider corresponding to the respective predictive model, wherein the first set of follow-on healthcare providers for the healthcare provider comprises the respective set of follow-on healthcare providers for the healthcare provider.

5. The method of claim 1, further comprising instructing, by the computing system, an identity theft protection vendor system to send the subscriber alert.

6. A computing system comprising:
a set of one or more communication units configured to receive, via a communications network, a verification of benefits (VoB) request that was submitted by a healthcare provider and that identifies a subscriber, the VoB request comprising a request for the computing system to verify that a health insurance policy of the subscriber is active; and
one or more processors configured to:
in response to receiving the VoB request:
determine whether the health insurance policy of the subscriber is active; and
provide a VoB response to the healthcare provider, the VoB response indicating whether the health insurance policy of the subscriber is active;
identify a communication channel that is specific to the subscriber from among a plurality of communication channels, wherein identifying the communication channel comprises accessing a database that maps a plurality of subscribers to the communication channels, wherein the subscribers include the subscriber, and the communication channel is one of a special-purpose application installed on a mobile phone of the subscriber, an email account of the subscriber, an instant message account of the subscriber, a phone number of the subscriber, or a mobile device associated with the subscriber; and
in response to determining that the health insurance policy of the subscriber is active and prior to the healthcare provider performing a healthcare action:
determine whether to send a subscriber alert to the subscriber, wherein the subscriber alert notifies the subscriber that the healthcare provider has been requested to perform the healthcare action for the subscriber in the future as of a time the healthcare provider submitted the VoB request, wherein the one or more processors are configured to, as part of determining whether to send the subscriber alert:
select a predictive model that corresponds to the healthcare provider;
apply the predictive model to determine a first set of follow-on healthcare providers;
determine whether the VoB request was submitted by one of the first set of follow-on healthcare providers; and
determine to send the subscriber response in response to determining that the VoB request was not submitted by one of the first set of follow-on healthcare providers; and
based on a determination to send the subscriber alert:
send the subscriber alert to the subscriber via the communication channel, or
instruct another computing system to send the subscriber alert to the subscriber via the communication channel.

7. The computing system of claim 6, wherein:
the one or more communication units are further configured to receive a subscriber response that is responsive to the subscriber alert, the subscriber response indicating whether the subscriber believes that the VoB request is legitimate, and
the one or more processors are configured to open an investigation of the VoB request based on the subscriber response indicating that the subscriber believes that the VoB request is not legitimate.

8. The computing system of claim 6, wherein:
the one or more processors are configured such that, as part of determining whether to send the subscriber alert, the one or more processors determine a cohort to which the subscriber belongs, and
the one or more processors are configured such that, as part of applying the predictive model, the one or more processors provide information indicating the determined cohort is input to the predictive model.

9. The computing system of claim 6, wherein:
the predictive model that corresponds to the healthcare provider is a first predictive model,
a plurality of predictive models comprises the first predictive model,
each of the predictive models corresponds to a respective healthcare provider among a plurality of healthcare providers comprising the healthcare provider, and
for each respective predictive model of the predictive models, the one or more processors are configured to train the respective predictive model to identify a respective set of follow-on healthcare providers for the respective healthcare provider corresponding to the respective predictive model, wherein the first set of follow-on healthcare providers for the healthcare provider comprises the respective set of follow-on healthcare providers for the healthcare provider.

10. The computing system of claim 6, wherein the one or more communication units are further configured to send instructions to an identity theft protection vendor system to send the subscriber alert.

11. The computing system of claim 6, further comprising one or more subscriber devices configured to receive subscriber alerts.

12. The computing system of claim 6, further comprising one or more healthcare provider computing systems configured to submit VoB requests to an insurer computing system.

13. A non-transitory computer-readable storage medium having instructions stored thereon that, when executed, configure a computing system to:
receive, via a communications network, a verification of benefits (VoB) request that identifies a subscriber and a healthcare provider that submitted the VoB request, the VoB request comprising a request for the computing system to verify that a health insurance policy of the subscriber is active;
in response to receiving the VoB request:
determine whether the health insurance policy of the subscriber is active; and
provide a VoB response to the healthcare provider, the VoB response indicating whether the health insurance policy of the subscriber is active;
identify a communication channel that is specific to the subscriber from among a plurality of communication channels, wherein identifying the communication channel comprises accessing a database that maps a plurality of subscribers to the communication channels, wherein the subscribers comprises the subscriber, and the communication channel is one of a special-purpose application installed on a mobile phone of the subscriber, an email account of the subscriber, an instant message account of the subscriber, a phone number of the subscriber, or a mobile device associated with the subscriber; and
in response to determining that the health insurance policy of the subscriber is active and prior to the healthcare provider performing a healthcare action:
determine whether to send a subscriber alert to the subscriber, wherein the subscriber alert notifies the subscriber that the healthcare provider has been requested to perform the healthcare action for the subscriber in the future as of a time the healthcare provider submitted the VoB request, wherein the instructions configure the computing system to, as part of determining whether to send the subscriber alert:
select a predictive model that corresponds to the healthcare provider;
apply the predictive model to determine a first set of follow-on healthcare providers;
determine whether the VoB request was submitted by one of the first set of follow-on healthcare providers; and
determine to send the subscriber response in response to determining that the VoB request was not submitted by one of the first set of follow-on healthcare providers; and
based on a determination to send the subscriber alert:
send the subscriber alert to the subscriber via the communication channel, or
instruct another computing system to send the subscriber alert to the subscriber via the communication channel.

14. A computing system comprising:
means for receiving, via a communications network, a verification of benefits (VoB) request that identifies a subscriber and a healthcare provider that submitted the VoB request, the VoB request comprising a request for the computing system to verify that a health insurance policy of the subscriber is active;
means for determining, in response to receiving the VoB request, whether a health insurance policy of the subscriber is active and providing a VoB response to the healthcare provider, the VoB response indicating whether the health insurance policy of the subscriber is active;
means for identifying a communication channel that is specific to the subscriber from among a plurality of communication channels, wherein identifying the communication channel comprises accessing a database that maps a plurality of subscribers to the communication channels, wherein the subscribers comprise the subscriber, and the communication channel is one of a special-purpose application installed on a mobile phone of the subscriber, an email account of the subscriber, an instant message account of the subscriber, a phone number of the subscriber, or a mobile device associated with the subscriber;
means for determining, in response to determining that the health insurance policy of the subscriber is active and prior to the healthcare provider performing a healthcare action, whether to send a subscriber alert to the subscriber, wherein the subscriber alert notifies the subscriber that the healthcare provider has been requested to perform the healthcare action for the subscriber in the future as of a time the healthcare provider submitted the VoB request, wherein the means for determining whether to send the subscriber alert comprise:
means for selecting a predictive model that corresponds to the healthcare provider;
means for applying the predictive model to determine a first set of follow-on healthcare providers;
means for determining whether the VoB request was submitted by one of the first set of follow-on healthcare providers; and
means for determining to send the subscriber response in response to determining that the VoB request was not submitted by one of the first set of follow-on healthcare providers; and
means for sending, based on a determination to send the subscriber alert, the subscriber alert to the subscriber via the communication channel, or
means for instructing another computing system to send the subscriber alert to the subscriber via the communication channel.

15. The method of claim 1, wherein utilizing the rule engine comprises:
accessing, by the computing system, a portion of claims history stored in an operational data store, wherein the portion of the claims history relates to a particular time period; and
using, by the computing system, the accessed portion of the claims history to evaluate one or more rules in the set of rules.

16. The method of claim 1, wherein the set of rules includes at least one of:
- a binary rule that explicitly specifies whether or not to send the subscriber alert, or
- a point-value rule that specifies a point value that is awarded if a condition specified by the point value rule is satisfied, wherein the rule engine is configured to send the subscriber alert if a total of awarded points exceeds a threshold.

* * * * *